United States Patent [19]

Kuwabara et al.

[11] Patent Number: 5,053,435
[45] Date of Patent: Oct. 1, 1991

[54] PRE-FOAMED PARTICLES OF UNCROSSLINKED, LINEAR LOW-DENSITY POLYETHYLENE AND PRODUCTION METHOD THEREOF

[75] Inventors: Hideki Kuwabara, Hadano; Masashi Hashiba, Isehara; Masato Naito, Hiratsuka, all of Japan

[73] Assignee: Japan Styrene Corporation, Tokyo, Japan

[21] Appl. No.: 519,271

[22] Filed: May 4, 1990

Related U.S. Application Data

[62] Division of Ser. No. 204,010, Jun. 8, 1988, Pat. No. 4,948,817.

[30] Foreign Application Priority Data

Jun. 23, 1987 [JP] Japan ................. 62-156310

[51] Int. Cl.$^5$ ............................. C08J 9/22
[52] U.S. Cl. ............................ 521/60; 521/56; 521/143
[58] Field of Search ........... 521/56, 60, 147, 59, 521/144

[56] References Cited

U.S. PATENT DOCUMENTS

| | | | |
|---|---|---|---|
| 3,953,558 | 4/1976 | Hatano et al. | 264/22 |
| 3,988,404 | 10/1976 | Orimo et al. | 264/45.9 |
| 4,168,353 | 9/1979 | Kitamori | 521/59 |
| 4,275,023 | 6/1981 | Shimizu et al. | 264/50 |
| 4,379,859 | 4/1983 | Hirosawa et al. | 521/59 |
| 4,443,393 | 4/1984 | Akiyama et al. | 264/53 |
| 4,448,901 | 5/1984 | Senda et al. | 521/60 |
| 4,464,484 | 8/1984 | Yoshimura et al. | 521/58 |
| 4,525,485 | 6/1985 | Maeda et al. | 521/58 |
| 4,540,718 | 9/1985 | Senda et al. | 521/58 |
| 4,567,208 | 1/1986 | Kuwabara et al. | 521/59 |
| 4,587,270 | 5/1986 | Kuwabara et al. | 521/58 |
| 4,617,322 | 10/1986 | Senda et al. | 521/60 |
| 4,656,197 | 4/1987 | Yoshimura et al. | 521/60 |
| 4,704,239 | 11/1987 | Yoshimura et al. | 264/50 |
| 4,716,021 | 12/1987 | Akiyama et al. | 422/135 |
| 4,749,725 | 6/1988 | Akiyama et al. | 521/58 |
| 4,761,431 | 8/1988 | Nakamura | 521/56 |
| 4,777,000 | 10/1988 | Kuwabara et al. | 264/51 |
| 4,778,829 | 10/1988 | Ichimura et al. | 521/56 |
| 4,810,440 | 3/1989 | Yoshida et al. | 521/56 |
| 4,840,973 | 6/1989 | Kuwabara et al. | 521/58 |
| 4,889,671 | 12/1989 | Akiyama et al. | 264/53 |
| 4,948,817 | 8/1990 | Kuwabara et al. | 521/60 |
| 4,968,723 | 11/1990 | Seuda et al. | 521/60 |

*Primary Examiner*—Morton Foelak
*Attorney, Agent, or Firm*—Sherman and Shalloway

[57] ABSTRACT

Pre-foamed particles of an uncrosslinked, linear low-density polyethylene have a crystalline structure characterized in that two endothermic peaks appear on a DSC curve obtained by differential scanning calorimetry of the pre-foamed particles (said DSC curve having been obtained by heating 1–5 mg of the pre-foamed particles to 220° C. at a rate of 10° C./min by a differential scanning calorimeter) and the energy at the endothermic peak on the higher-temperature side is 5 J/g or more. A process for the production of the pre-foamed particles of the uncrosslinked, linear low-density polyethylene is also disclosed.

5 Claims, 1 Drawing Sheet

PRE-FOAMED PARTICLES OF UNCROSSLINKED, LINEAR LOW-DENSITY POLYETHYLENE AND PRODUCTION METHOD THEREOF

This application is a division of application Ser. No. 07/204,010, filed June 8, 1988, now U.S. Pat. No. 4,948,817, issued Aug. 14, 1990.

BACKGROUND OF THE INVENTION

1) Field of the Invention:

This invention relates to pre-foamed particles of an uncrosslinked, linear low-density polyethylene.

2) Description of the Related Art:

So-called articles expansion-molded from foamable beads (expansion-molded articles), which are obtained by filling pre-foamed particles in individual molds and then heating them, thereby expanding the pre-foamed particles, have been utilized in wide-spread applications such as bumping (shock absorbing) materials, packaging materials, heat insulating materials and building materials owing to their excellent bumping properties, heat insulating properties, etc. Their demand has hence increased largely in recent years.

Articles molded from foamed polystyrene particles have been known as such expansion-molded articles. The expansion-molded articles of the polystyrene beads are however accompanied by a fatal drawback that they are brittle and moreover, by another drawback that they are poor in chemical resistance. It has hence been desired to improve such drawbacks from early on. As those for solving such drawbacks, there has been proposed articles molded from foamed polyethylene particles. However, since polyethylene resins remarkably decrease in viscosity near their melting points, crosslinked polyethylene resins have usually been employed. If pre-foamed particles of the crosslinked polyethylene resin are used, it is however difficult to obtain any low-density (high-expanded) molded articles by expansion molding. If trying by force to obtain low-density molded articles, molded articles, which undergo significant shrinking and have high water absorbency and poor physical properties, are obtained only. Therefore, it is quite impossible to obtain low-density molded articles of the polyethylene resins, which can be put to practical use. In addition, although a high-pressure-processed low-density polyethylene is principally used as a base material for the crosslinked polyethylene owing to its good crosslinkability, the high-pressure-processed low-density polyethylene has poor heat resistance and insufficient stiffness. Thus, its expansion molding must of necessity be conducted at a relatively low expansion ratio.

As a method for solving such problems, it has been proposed in Japanese Patent Publication No. 10,047/1985 to mold pre-foamed particles of an uncrosslinked, linear low-density polyethylene. The pre-foamed particles of the uncrosslinked polyethylene are however accompanied by such problems that secondary foaming cannot be achieved sufficiently and excellent molded articles cannot hence be obtained unless expanding ability is imparted to the pre-foamed particles because of a fact that their heating temperature range upon molding is limited and it is hence impossible to heat them sufficiently, and the crystalline structure of the uncrosslinked, linear low-density polyethylene. When the pre-foamed particles of the uncrosslinked, linear low-density polyethylene is molded, it is therefore used to feed an additional supply of a gaseous foaming agent or inorganic gas such as air to the pre-foamed particles prior to the molding, thereby building up an internal pressure therein. The feeding of an additional supply of the gaseous foaming agent or inorganic gas to the pre-foamed particles is however accompanied by a problem that it results in considerable loss in both equipment and expense, and the production cost of molded articles comes expensive. Furthermore, pre-foamed particles of polyolefin resins generally tend to dissipate gas in cells. It is hence difficult to hold foaming ability for a long period of time even if the pre-foamed particles are imparted with foaming ability by additional supply of inorganic gas or the like to build up an internal pressure therein. In order to obtain excellent molded articles by these conventional techniques, it is hence necessary to consume the pre-foamed particles within a short period of time subsequent to the build-up of internal pressure. They are by no means considered to have been completed to such an extent that many molding companies can produce molded articles easily from pre-foamed particles furnished by pre-foamed particles makers.

On the other hand, it is disclosed in Japanese Patent Publication No. 7816/1980 to obtain a molded article by molding pre-foamed particles of a crosslinked polyethylene resin without need for the pretreatment to build up an internal pressure therein by additional supply of inorganic gas or the like, cooling the contents to a temperature ranging from the softening temperature of the resin (exclusive) to room temperature, heating the contents to a temperature ranging from (the softening temperature of the resin—40° C.) to the softening temperature (exclusive), and then cooling the contents gradually. The pre-foamed particles of the crosslinked polyethylene resin is however accompanied by a problem that it is difficult to obtain low-density molded articles as described above even if they can be molded without need for any pretreatment to build up an internal pressure. All the techniques described above were satisfactory insufficiently.

SUMMARY OF THE INVENTION

With the foregoing in view, the present inventors have carried out an extensive investigation. As a result, it has been found that pre-foamed particles of an uncrosslinked, linear low-density polyethylene, which have a crystalline structure characterized in that two endothermic peaks appear on a DSC curve obtained by differential scanning calorimetry of the pre-foamed particles and the energy at the endothermic peak on the higher-temperature side is 5 J/g or more, can be molded without need for any pretreatment to build up an internal pressure therein to provided easily a low-density molded article having excellent physical properties such that water-absorbency is low and no shrinking occurs, leading to completion of this invention.

In one aspect of this invention, there is thus provided pre-foamed particles of an uncrosslinked, linear low-density polyethylene having a crystalline structure characterized in that two endothermic peaks appear on a DSC curve obtained by differential scanning calorimetry of the pre-foamed particles (said DSC curve having been obtained by heating 1–5 mg of the pre-foamed particles to 220° C. at a rate of 10° C./min by a differential scanning calorimeter) and the energy at the endothermic peak on the higher-temperature side is 5 J/g or more.

In another aspect of this invention, there is also provided a method for the production of pre-foamed particles of an uncrosslinked, linear low-density polyethylene, which comprises dispersing an uncrosslinked, linear low-density polyethylene resin and a volatile foaming agent in a dispersing medium in a closed vessel, heating the resultant dispersion without raising its temperature beyond a melting completion temperature Tm (°C.) of the resin particles (said melting completion temperature Tm having been determined from a peak on a DSC curve obtained by heating about 2-5 mg of a sample at a rate of 10° C./min), holding the dispersion to a temperature of (the melting point of the resin—20° C., inclusive) to (the melting point of the resin—10° C., exclusive) (said melting point being a temperature corresponding to the top of the peak on the DSC curve obtained by heating about 2-5 mg of the sample at a rate of 10° C./min), and then opening the vessel at one end thereof so as to release the resin particles and the dispersing medium from the inside of the vessel into an atmosphere the pressure of which is lower than that in the vessel, thereby expanding the resin particles.

The pre-foamed particles of the uncrosslinked, linear low-density polyethylene according to this invention have a crystalline structure characterized in that two endothermic peaks appear on a DSC curve obtained by differential scanning calorimetry of the pre-foamed particles and the energy at the endothermic peak on the higher-temperature side is 5 J/g or more. The present invention has hence brought about numerous advantageous effects. For example, their heating temperature range upon molding can be widened in spite of the pre-foamed particles of the uncrosslinked, linear low-density polyethylene. Since excellent molded articles can be obtained without need for any pretreatment to build up an internal pressure, it is possible to reduce any equipment and cost for building up such an internal pressure. Moreover, the pre-foamed particles according to this invention can provide easily low-density molded articles having excellent physical properties such that shrinking is little and water-absorbency is low. Furthermore, the pre-foamed particles of the uncrosslinked, linear low-density polyethylene, which have excellent physical properties described above, can be produced according to this invention.

BRIEF DESCRIPTION OF THE DRAWING

The above and other objects, features and advantages of the present invention will become apparent from the following description of the invention and appended claims, taken in conjunction with the accompanying drawing, in which:

DETAILED DESCRIPTION OF THE INVENTION AND PREFERRED EMBODIMENTS

Figure 1:
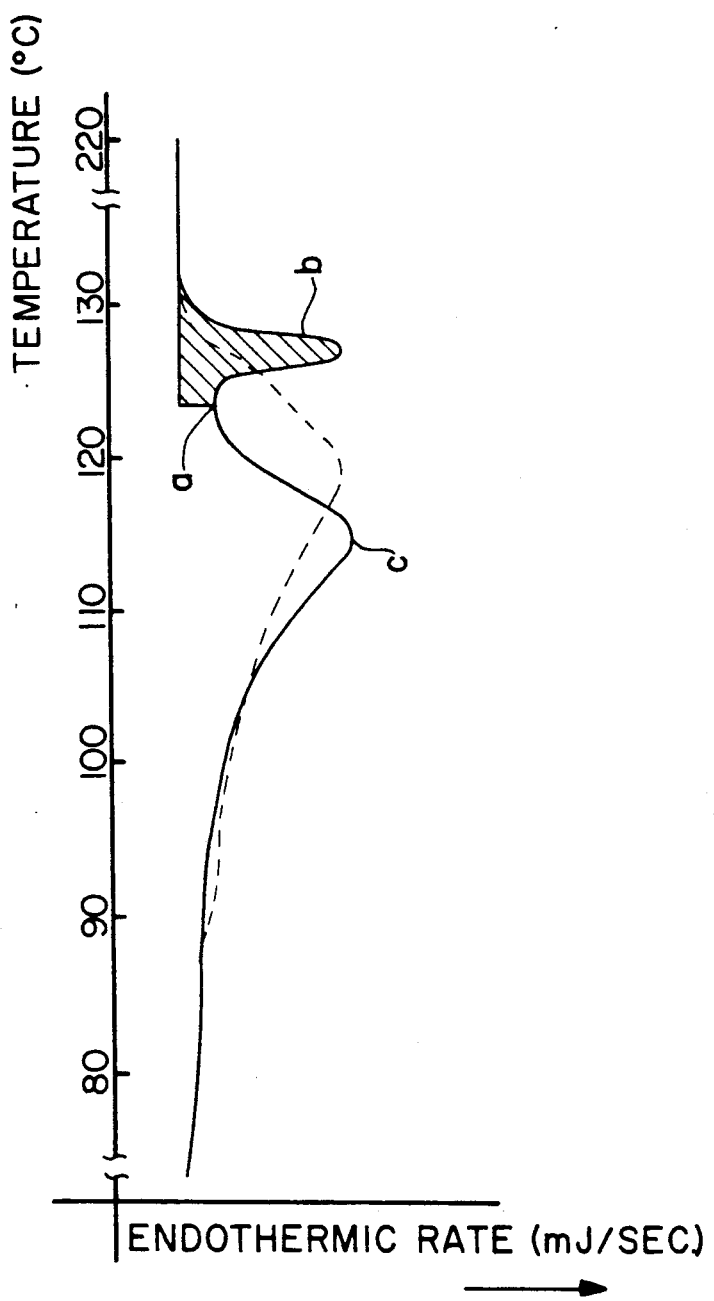
FIG. 1 shows DSC curves obtained by differential scanning calorimetry of base resin particles and pre-foamed particles according to this invention, in which a solid line is a DSC curve of the pre-foamed particles according to this invention and a broken line is a DSC curve of the base resin particles used for the production of the pre-foamed particles of this invention.

As exemplary uncrosslinked, linear low-density polyethylenes (hereinafter abbreviated as "LLDPE") which constitute the pre-foamed particles of this invention, may be mentioned copolymers of ethylene and an α-olefin having 4-10 carbon atoms. As exemplary $C_{4-10}$ α-olefins, may be mentioned 1-butene, 1-pentene, 1-hexene, 3,3-dimethyl-1-butene, 4-methyl-1-pentene, 4,4-dimethyl-1-pentene, 1-octene and the like. Of these, 1-butene is particularly preferred. The content of the α-olefin in LLDPE may generally be 1-9 mol % with 2-7 mol % being particularly preferred.

The pre-foamed particles according to this invention have a crystalline structure characterized in that two endothermic peaks appear on a DSC curve obtained by differential scanning calorimetry of the pre-foamed particles and the energy at the endothermic peak on the higher-temperature side is 5 J/g or more. The temperature corresponding to the valley between the peak on the higher-temperature side and the peak on the lower-temperature side is preferably higher than that corresponding to an endothermic peak which appears on a DSC curve of a base resin used.

The term "DSC curve" as used herein means a DSC curve to be obtained when measured by heating 1-5 mg of the pre-foamed particles to 220° C. at a rate of 10° C./min by a differential scanning calorimeter. The terms "inherent peak" and "high-temperature peak" as used herein mean those appearing on a DSC curve to be obtained, for example, when measured by heating a sample from room temperature to 220° C. at a rate of 10° C./min.

The endothermic peak on the lower-temperature side appears to occur due to absorption of heat upon so-called melting of LLDPE constituting the pre-foamed particles. On the other hand, the endothermic peak on the higher-temperature side seems to be attributed to the existence of a crystalline structure different from the structure which appears as the endothermic peak on the lower-temperature side. On the DSC curve obtained by measuring the base resin particles under the same condition, an endothermic peak alone, which seems to occur due to melting of the raw resin appears but another endothermic peak does not appear. Accordingly, it is considered that the endothermic peak on the higher-temperature side is not attributed to the crystalline structure, etc. that the base resin had by itself but is caused by the crystalline structure, etc that the pre-foamed particles had by themselves (In FIG. 1, the DSC curve of the pre-foamed particles and the DSC curve of the base resin particles are shown by a solid line and a broken line, respectively).

The energy at the endothermic peak on the higher-temperature side is determined from the peak area of the higher-temperature side in FIG. 1, which is defined by dividing a high-temperature peak (b) and a low-temperature peak (c) at the valley (a) between the high-temperature peak and the low-temperature peak and then assuming the area of the peak on the temperature side higher than the valley (a) to be an area of the high-temperature peak (b). Namely, the energy at the endothermic peak on the higher-temperature side can be determined from the area on the high-temperature endothermic peak on a chart in accordance with the following equation:

Energy (J/g) at the endothermic peak on the higher-temperature side =

-continued (the area of the high-temperature peak on a chart, cm$^2$) × (the heat quantity per cm$^2$ of the chart, J/cm$^2$) ÷ (the weight of a sample measured, g)

In particular, the above-mentioned energy is preferably 5-25 J/g.

Pre-foamed particles of the present invention can be obtained by dispersing resin particles and a volatile foaming agent in a dispersing medium such as water in a vessel, heating the resultant dispersion, holding it at the heated state and then releasing the resin particle and the dispersing medium from the inside of the vessel into an atmosphere the pressure of which is lower than that in the vessel, thereby expanding the resin particles. In this case, the resin particles are heated in the vessel without raising their temperature beyond a melting completion temperature Tm (°C.) of the resin particles and their foaming temperature (the temperature upon the release) is controlled within a range of (the melting point of the resin—20° C., inclusive) to (the melting point of the resin—10° C., exclusive). The above-mentioned melting completion temperature Tm is a melting completion temperature on a DSC curve obtained by heating the resin particles used in the expansion at a rate of 10° C./min. The measurement of the melting completion temperature is conducted in a sample amount of about 2-5 mg. The melting point is a temperature corresponding to the top of a peak on the DSC curve obtained in the above measurement. The resin particles used in the production of the pre-foamed particles are preferably those obtained by heating them once to their melting point or higher and then quenching them in an atmosphere of (their crystallization temperature—40° C.) or lower. The term "crystallization temperature" as used herein means a temperature corresponding to the top of a peak on a DSC curve obtained by heating the resin particles once to 200° C. at a rate of 10° C./min and then cooling them at a rate of 10° C./min.

As exemplary volatile foaming agents used in the production of the pre-foamed particles of this invention, may be mentioned hydrocarbons and halogenated hydrocarbons, which have a boiling point of −50° C. to 120° C., such as propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane, and dichlorotetrafluoroethane. They may be used either singly or in combination. The volatile foaming agent is employed for the expansion by impregnating it into the LLDPE resin in an amount of 5-40 parts by weight per 100 parts by weight of the polyethylene resin.

The amount of the LLDPE particles dispersed in water is preferably 10-100 parts by weight per 100 parts by weight of water because productivity and dispersion stability become better and utility cost is reduced. The amount of the volatile foaming agent dispersed in water together with the above resin particles is determined in consideration of the kind of the foaming agent, expansion ratio intended, proportion of the amount of the resin in the vessel to space in the vessel, etc. in such a manner that the foaming agent contained in the resin particles is within the above range.

A dispersant may optionally be used when the resin particles is dispersed in water. The dispersant is used for the prevention of the agglomeration among the resin particles upon the heating. For example, may be used a water-soluble polymer such as polyvinyl alcohol, methylcellulose or N-polyvinyl pyrrolidone; and fine powder of a low water-solubility inorganic substance such as calcium phosphate, magnesium pyrophosphate, zinc carbonate, titanium oxide or aluminum oxide. When the above inorganic substance is employed as the dispersant, a small amount of a surface active agent such as sodium alkylbenzenesulfonate, sodium α-olefinsulfonate or sodium alkylsulfonate is preferably used in combination as a dispersing agent to reduce the amount of the inorganic substance used because the fusion-bonding among the resultant pre-foamed particles upon molding is achieved sufficiently. In this case, based on 100 parts by weight of the resin particles, about 0.1-3 parts by weight of the low water-solubility inorganic substance and about 0.001-0.5 part by weight of the anionic surface active agent are employed. On the other hand, the water-soluble polymer is used in an amount of about 0.1-5 parts by weight per 100 parts by weight of the resin particles.

The pre-foamed particles according to this invention is used for the production of expansion-molded articles from beads. If the pre-foamed particles of this invention employed without applying any pretreatment to build up an internal pressure therein prior to molding, excellent low-density expansion-molded articles free of shrinkage, etc. can be obtained. When the pre-formed particles are subjected to a pretreatment to build up an internal pressure therein on the other hand, secondary foamability can be imparted thereto by impregnating the pre-foamed particles with a volatile foaming agent, inorganic gas or both of them. Both unpretreated and pretreated pre-foamed particles can be separately molded into an expansion-molded article by filling them in a mold and then heating them with steam so that the pre-foamed particles are expanded. These pre-foamed particles can also be filled while compressing them so as to decrease their volume by 10-50% upon the filling in the mold and then molded.

The present invention will hereinafter be described in further detail by the following Examples.

EXAMPLES 1-3 & COMPARATIVE EXAMPLES 1-2

Each of LLDPEs, which had been obtained by copolymerizing ethylene and 1-butene, having a density, melt flow rate (MFR) and melting point shown respectively in Table 1 was melted in an extruder. The thus-melted LLDPE was then extruded into strands through a die. The strands were quenched in water, followed by their pelletizing into pellets of about 4 mg/pellet. Thereafter, 100 kg of the resultant pellets, 200 l of water and 0.3 kg of fine particulate aluminum oxide as a dispersant were charged in a 400-l autoclave. While stirring the contents, 35 kg of dichlorodifluoromethane was added thereto. The contents were heated to a foaming temperature shown in Table 1 without raising their temperature beyond a melting completion temperature of the pellets and held at the same temperature for 10 minutes. The internal pressure of the autoclave at this time was 22 kg/cm$^2$(G). The release valve at the bottom end of the autoclave was then opened at the same temperature to release the resin particles and water under the atmospheric pressure, thereby expanding the resin particles. The internal pressure of the autoclave during the release was maintained at 30 kg/cm²(G) with air. Average expansion ratios of the thus-obtained respective pre-foamed particles and results of their differential scanning calorimetry are shown in Table 1. The pre-foamed particles were each left over at room temperature under the atmospheric pressure for 24 hours to age them and then filled in a mold of 300 mm×300 mm×60 mm. After evacuating air in the mold, molding was effected by heating with 1.2 kg/cm²(G) of steam. The resultant expansion-molded article was cooled with water and then taken out of the mold. After aging same at 80° C. for 20 hours, its physical properties were measured. Results are shown in Table 2.

TABLE 1

| | Raw LLDPE resin particles | | | | Properties of pre-foamed particles | | | | | |
| | | | | | | | DSC measurement | | | |
| | Density (g/cm³) | MFR (g/10 min) | Melting point (°C.) | Melting completion temp. (°C.) | Foaming temp. (°C.) | Average extension ratio (times) | Average(1) diameter of cell (μm) | Temp. of low-temp. peak (°C.) | Temp. of valley (°C.) | Temp. of high-temp. peak (°C.) | Melting energy of high-temp. peak (J/g) |
|---|---|---|---|---|---|---|---|---|---|---|---|
| Ex. 1 | 0.925 | 1.0 | 124 | 129 | 110 | 37 | 100 | 120 | 128 | 132 | 18 |
| Ex. 2 | 0.928 | 1.5 | 125 | 131 | 111 | 32 | 50 | 117 | 127 | 131 | 10 |
| Ex. 3 | 0.923 | 2 | 123 | 130 | 109 | 30 | 500 | 120 | 124 | 127 | 6 |
| Comp. Ex. 1 | 0.923 | 1.0 | 123 | 130 | 117 | 38 | 150 | 116 | 124 | 128 | 3 |
| Comp. Ex. 2 | 0.920 | 0.8 | 123 | 128 | 109 | 30 | 1200 | 120 | 128 | 130 | 4 |

(1)Measured in accordance with ASTM D3576.

TABLE 2

| | Volumetric shrinkage factor (%) | Water-(1) absorbency | Mold-(2) ability | Compression(3) hardness (kg/cm²) |
|---|---|---|---|---|
| Ex. 1 | 9.0 | ○ | ○ | 0.55 |
| Ex. 2 | 8.5 | ○ | ○ | 0.55 |
| Ex. 3 | 8.0 | ○ | ○ | 0.70 |
| Comp. Ex. 1 | 30 | X | X | 0.45 |
| Comp. Ex. 2 | 35 | X | X | 0.50 |

Note:
(1)The water-absorption was measured in accordance with JIS K6767B and evaluated by the following standard:
Less than 0.005 g/cm³ ... ○
Not less than 0.005 g/cm³ ... X
(2)The molding stability where molding was effected with varied molding steam pressure in a range of 1.2–1.6 kg/cm² (G) was observed and the moldability was evaluated by the following standard:
Moldable similarly with any steam pressure ... ○
Molding stability varied depending on steam pressure ... X
(3)The compression hardness was measured in accordance with JIS K 6767.

Having now fully described the invention, it will be apparent to one of ordinary skill in the art that many change and modification can be made thereto without departing from the spirit or scope of the invention as set forth herein.

We claim:

1. Pre-foamed particles consisting essentially of an uncrosslinked, linear low-density polyethylene having a crystalline structure characterized in that two endothermic peaks appear on a DSC curve obtained by differential scanning calorimetry, of the pre-foamed particles (said DSC curve having been obtained by heating 1–5 mg of the pre-formed particles to 220° C. at a rate of 10° C./min by a differential scanning calorimeter) and the energy at the endothermic peak on the higher-temperature side is 5 J/g or more.

2. The pre-foamed particles as claimed in claim 1, wherein the uncrosslinked, linear low-density polyethylene is a copolymer composed of α-olefin and ethylene and containing 1–9 mol% of α-olefin.

3. The pre-foamed particles as claimed in claim 1, wherein the energy at the endothermic peak on the higher-temperature side is 5–25 J/g.

4. The pre-foamed particles as claimed in claim 1, wherein the temperature corresponding to the valley between the peak on the higher-temperature side and the peak on the lower-temperature side is higher than that corresponding to an endothermic peak which appears on a DSC curve of a base resin.

5. The pre-foamed particles of claim 1 which are the product obtained by heating an uncrosslinked, linear low-density polyethylene to a temperature of the melting point of the resin or higher, quenching the heated resin in an atmosphere at a temperature of at least 40° C. lower than the crystallization temperature of the resin, wherein the crystallization temperature is a temperature corresponding to the top of a peak on a DSC curve obtained by heating about 2–5 mg of a sample of the resin to 200° C. at a rate of 10° C./min and then cooling the sample at a rate of 10° C./min, dispersing said heated and quenched uncrosslinked, linear low-density polyethylene resin and a volatile foaming agent in a dispersing medium in a closed vessel, heating the resultant dispersion without raising its temperature beyond a melting completion temperature Tm(°C.) of the resin particles (said melting completion temperature Tm having been determined from a peak on a DSC curve obtained by heating about 2–5 mg of a sample at a rate of 10° C./min), holding the dispersion to a temperature of (the melting point of the resin −20° C., inclusive) to (the melting point of the resin −10° C., exclusive) (said melting point being a temperature corresponding to the top of the peak on the DSC curve obtained by heating about 2–5 mg of the sample at a rate of 10° C./min), and then opening the vessel at one end thereof so as to release the resin particles and the dispersing medium from the inside of the vessel into an atmosphere the pressure of which is lower than that in the vessel, thereby expanding the resin particles.

* * * * *